US009521592B2

(12) United States Patent
Qu et al.

(10) Patent No.: US 9,521,592 B2
(45) Date of Patent: Dec. 13, 2016

(54) ENHANCEMENT ON VOICE CALL CONTINUITY DURING HANDOVER

(75) Inventors: Zhiwei Qu, Shanghai (CN); Meijuan Zheng, Shanghai (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 24 days.

(21) Appl. No.: 14/419,702

(22) PCT Filed: Aug. 7, 2012

(86) PCT No.: PCT/CN2012/079770
§ 371 (c)(1),
(2), (4) Date: Feb. 5, 2015

(87) PCT Pub. No.: WO2014/022967
PCT Pub. Date: Feb. 13, 2014

(65) Prior Publication Data
US 2015/0215823 A1 Jul. 30, 2015

(51) Int. Cl.
*H04W 4/00* (2009.01)
*H04W 36/00* (2009.01)
*H04W 8/04* (2009.01)

(52) U.S. Cl.
CPC ........... *H04W 36/0022* (2013.01); *H04W 8/04* (2013.01); *H04W 36/0016* (2013.01)

(58) Field of Classification Search
CPC ...... H04W 4/005; H04W 24/08; H04W 88/08; H04W 36/0022; H04W 8/02; H04W 12/08; H04W 4/001; H04W 4/12; H04W 8/20; H04W 36/0033; H04W 8/04; H04W 8/06
See application file for complete search history.

(56) References Cited

U.S. PATENT DOCUMENTS

2008/0267128 A1  10/2008  Bennett et al.
2011/0176510 A1*  7/2011  Hallenstal .......... H04W 36/0022
                                                     370/331
(Continued)

FOREIGN PATENT DOCUMENTS

CN       101247634 A     8/2008

OTHER PUBLICATIONS

3GPP, 3rd General Partnership Project; Technical Specification Group Services and System Aspects; Single Radio Voice Call Continuity (SRVC); Stage 2 (Release 12), 3GPP TS 23.216 V12.1.0, 2014, 69 pages.

(Continued)

*Primary Examiner* — Michael J Moore, Jr.
(74) *Attorney, Agent, or Firm* — Rothwell, Figg, Ernst & Manbeck, P.C.

(57) ABSTRACT

A handover of a user equipment (UE) between different radio access networks (RANs). For enhancing voice call continuity (VCC). One method comprises: receiving a request for registering in a first node for mobility management in the target RAN from the UE; if the mobility management for the UE fails to be transferred from a second node for mobility management in the source RAN to the first node, inquiring of a HLR/HSS about a third node for mobility management for the UE in the source RAN, wherein the second node is determined from the request for registering, and the third node is determined based on a correlation between the UE and the third node; and sending to the third node a request for transferring the mobility management for the UE from the third node to the first node.

19 Claims, 5 Drawing Sheets

(56) References Cited

U.S. PATENT DOCUMENTS

| | | | | |
|---|---|---|---|---|
| 2011/0249652 A1* | 10/2011 | Keller | ............... | H04W 36/0022 |
| | | | | 370/331 |
| 2013/0084860 A1* | 4/2013 | Wong | ................... | H04W 60/00 |
| | | | | 455/435.1 |
| 2013/0188601 A1* | 7/2013 | Sun | ...................... | H04W 36/14 |
| | | | | 370/331 |
| 2013/0329647 A1* | 12/2013 | Keller | ..................... | H04W 8/04 |
| | | | | 370/328 |
| 2015/0016420 A1* | 1/2015 | Balabhadruni | ......... | H04W 4/22 |
| | | | | 370/331 |
| 2015/0024703 A1* | 1/2015 | Lindholm | ......... | H04W 36/0022 |
| | | | | 455/404.1 |

OTHER PUBLICATIONS

3GPP, 3rd General Partnership Project; Technical Specification Group Core Network and Terminals; Evolved Packet System (EPS); Mobility Management Entity (MME) and Serving GPRS Support Node (SGSN) related interfaces based on Diameter protocol (Release 12), 3GPP TS 29.272 V12.6.0, 2014, 134 pages.

3GPP, 3rd General Partnership Project; Technical Specification Group Core Network and Terminals; Mobile Application Part (MAP) specification (Release 12), 3GPP TS 29.002 V12.6.0, 2014, 233 pages.

* cited by examiner

ENHANCEMENT ON VOICE CALL
CONTINUITY DURING HANDOVER

CROSS REFERENCE TO RELATED
APPLICATION(S)

This application is a 35 U.S.C. §371 National Phase Entry Application from PCT/CN2012/079770, filed Aug. 7, 2012, designating the United States, the disclosure of which is incorporated herein in its entirety by reference.

TECHNICAL FIELD

The present invention generally relates to a handover of a user equipment (UE) between different radio access networks (RANs). More particularly, the present invention relates to methods for enhancing voice call continuity (VCC) during a handover of a UE between two RANs providing voice service via packet switched (PS) domain and circuit switched (CS) domain respectively. The present invention also relates to apparatus adapted for the same purpose.

BACKGROUND

The Long-Term Evolution (LTE), whose radio access is called Evolved UMTS Terrestrial Radio Access Network (E-UTRAN), is the latest standard in the mobile network technology tree that previously realized the GSM/EDGE and UMTS/HsxPA network technologies. In light of the progressive deployment of LTE, co-existence with other radio access technologies, such as 3GPP UMTS Terrestrial Radio Access Network (UTRAN) and GSM/Edge Radio Access Network (GERAN), is expected.

In order to give service providers the ability to deliver a seamless mobility experience, it shall allow for end-to-end Quality of service (QoS) during connections and handover to other fixed line and wireless access technologies. LTE is designed to support IP-based voice traffic enabling better integration with other services. However, UTRAN/GERAN provides voice service only via circuit switched (CS) domain. Thus, VCC is an important issue during a handover between the above two radio access networks.

Single Radio Voice Call Continuity (SRVCC) refers to a mechanism designed to maintain voice call continuity between IMS over PS access and CS access for calls while a UE moves from E-UTRAN to UTRAN/GERAN where voice over PS core network is impossible due to network deployment. For facilitating session transfer of the voice component to the CS domain, IMS multimedia telephony sessions need to be anchored in the IMS. FIG. 1 shows a typical handover architecture between E-UTRAN and UTRAN/GERAN. The details ara described in 3GPP TS 23.216, which is incorporated herein by reference in its entirety.

Under some circumstances, however, a voice call is possibly interrupted during a SRVCC handover. FIG. 2 illustrates an example of an interruption which occurs during the SRVCC handover from E-UTRAN to GERAN/UTRAN.

With reference to FIG. 2, at step S201, a UE 20 makes an IMS voice call with a "SRVCC operation possible" indicator set to be "true" in a MME 10, which is a serving node for mobility management for the UE 20 in E-UTRAN. If the UE 20 moves to a new geographical location, then at step S202, a PS handover occurs from the MME 10 to a MME 40, which is another serving node for mobility management for the UE 20 in E-UTRAN, to keep the voice call active, and then at step S203, the MME 40 waits for a TAU Request from the UE 20.

At step S204, it is assumed that an eNodeB 30 initiates a SRVCC handover. Note that at this time, a TAU procedure in the MME 40 has not been triggered. Then at step S205, the SRVCC handover from E-UTRAN to GERAN/UTRAN for the UE 20 is performed. The flow proceeds to step S207, where the UE 20 initiates a RAU procedure by sending a RAU Request message to a SGSN 50, which is a serving node for mobility management for the UE in GERAN/UTRAN. The RAU Request message includes PTMSI derived from GUTI allocated by the MME 10.

At step S208, the SGSN 50 sends a Context Request message in order to obtain information concerning the UE 20 in a Context Response from the MME 10. At this step, because the latest available GUTI used by the UE 20 is allocated by the MME 10, the SGSN 50 sends the request to the MME 10. However, the MME 10 may have no information concerning the UE 20. Specifically, after the PS handover is performed from the MME 10 to a MME 40 at step S202, the MME 10 starts a timer and when the timer expires, it will delete the information at step S206. Therefore, if step S206 occurs prior to step S208, the MME 10 cannot retrieve the information concerning the UE 20 and will return a Context Response message with cause value "imsi unknown". As a result, at step S209, the SGSN 50 sends a RAU Reject message to the UE 20, which has to initiate an attach procedure again.

SUMMARY

In light of the above, one of the objects of the present invention is to provide a solution for enhancing voice call continuity (VCC) during a handover of a UE between two RANs providing voice service via packet switched (PS) domain and circuit switched (CS) domain respectively.

According to one aspect of the invention, a Mobility Management Entity MME, comprising:
  a receiving unit for receiving a request for a handover of
    a UE from a source radio access network RAN to a
    target radio access network RAN, the two RANs provide
    voice service via packet switched domain and
    circuit switched domain, respectively;
  a registering unit for in response to the request for the
    handover, or after a predetermined period elapsing
    from a handover of the UE to the MME, registering a
    correlation between the UE and the MME in a Home
    Location Register/Home Subscriber Server HLR/HSS;
    and
  a transferring unit for in response to a request for transferring
    from a Serving GPRS Support Node SGSN,
    transferring the mobility management for the UE to the
    SGSN.

According to another aspect of the invention, a Serving GPRS Support Node SGSN, comprising:
  a receiving unit for receiving a request for registering in
    the SGSN from a user equipment UE upon a handover
    from a source radio access network RAN to a target
    radio access network RAN, the two RANs providing
    voice service via packet switched domain and circuit
    switched domain, respectively;
  an obtaining unit for obtaining mobility management for
    the UE upon the handover;
  an inquiring unit for inquiring of a HLR/HSS about a first
    Mobility Management Entity MME for mobility management
    for the UE in the source RAN if the mobility management for the UE fails to be transferred from a second MME to the SGSN, wherein the first MME is determined based on a correlation between the UE and the first MME registered in the HLR/HSS, and the second MME is determined from the request for registering from the UE.

According to another aspect of the invention, a method for enhancing voice call continuity during a handover of a user equipment UE from a source radio access network RAN to a target radio access network RAN, the two RANs providing voice service via packet switched domain and circuit switched domain respectively, the method comprising:
in response to a request for the handover from the source RAN to the target RAN, or after a predetermined period elapsing from a handover of the UE to a first node for mobility management in the source RAN, registering a correlation between the UE and the first node in a Home Location Register/Home Subscriber Server HLR/HSS; and
in response to a request for transferring from a second node for mobility management in the target RAN, transferring the mobility management for the UE from the first node to the second node.

In a preferred embodiment according to the present invention, wherein the request for transferring is made by the following steps:
receiving a request for registering in the second node from the UE;
if the mobility management for the UE fails to be transferred from a third node for mobility management in the source RAN to the second node, the second node inquiring of the HLR/HSS about the first node based on the correlation, wherein the third node is determined from the request for registering; and
the second node sending to the first node the request for transferring.

In a preferred embodiment according to the present invention, wherein the registering step is performed by sending an Update Location Request from the first node to the HLR/HSS.

In a preferred embodiment according to the present invention, wherein the inquiring is performed by MAP_SEND_ROUTING_INFO_FOR_GPRS Request/MAP_SEND_ROUTING_INFO_FOR_GPRS Response, in the MAP_SEND_ROUTING_INFO_FOR_GPRS Request, parameters "GGSN address" and "GGSN number" are replaced with address and number of the second node.

In a preferred embodiment according to the present invention, wherein the inquiring is performed by a pair of request message and response message, the request message including information elements "IMSI" for the UE and "SGSN number" for the second node, and the response message including information element "S3/Gn Address" or "S10/S16 Address" for the first node.

According to another aspect of the invention, a method for enhancing voice call continuity during a handover of a user equipment UE from a source radio access network RAN to a target radio access network RAN, the two RANs providing voice service via packet switched domain and circuit switched domain respectively, the method comprising:
receiving a request for registering in a first node for mobility management in the target RAN from the UE;
if the mobility management for the UE fails to be transferred from a second node for mobility management in the source RAN to the first node, inquiring of a HLR/HSS about a third node for mobility management for the UE in the source RAN, wherein the second node is determined from the request for registering, and the third node is determined based on a correlation between the UE and the third node; and
sending to the third node a request for transferring the mobility management for the UE from the third node to the first node.

In a preferred embodiment according to the present invention, wherein the correlation is registered in the HLR/HSS by the following step:
in response to a request for the handover from the source RAN to the target RAN, or after a predetermined period elapsing from a handover of the UE to the third node for mobility management in the source RAN, the third node registering the correlation in a Home Location Register/Home Subscriber Server HLR/HSS.

According to one or more embodiments of the present invention, the serving node for mobility management in the target RAN can locate a proper node for mobility management in the source RAN by visiting the HLR/HSS even if an initial attempt for having the mobility management from the source RAN fails. Therefore, the UE has no need to initiate an attach procedure again. Furthermore, according to one or more embodiments of the present invention, the implementation thereof may be made with a minor modification to the existing 3GPP specifications, e.g., 3GPP TS 29.002 and 3GPP TS 29.272.

BRIEF DESCRIPTION OF THE DRAWINGS

The foregoing and other objects, features, and advantages of the invention will be apparent from the following more particular description of preferred embodiments as illustrated in the accompanying drawings in which.

DETAILED DESCRIPTION

Figure 1:
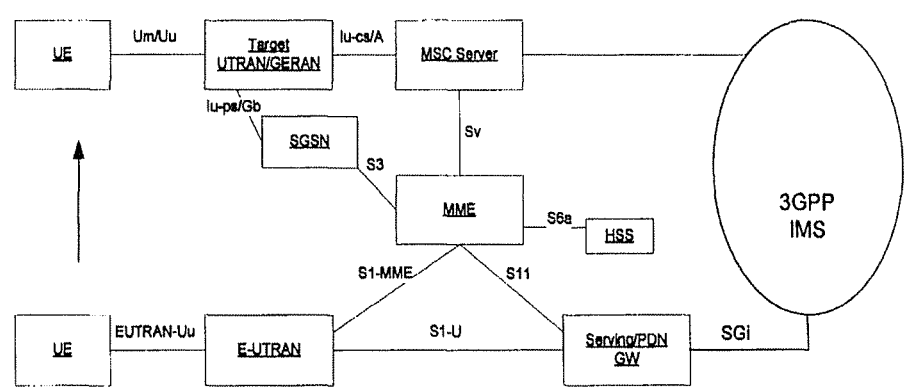
FIG. 1 shows a typical architecture for E-UTRAN to UTRAN/GERAN.

While the invention covers various modifications and alternative constructions, embodiments of the invention are shown in the drawings and will hereinafter be described in detail. However, it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

Unless defined in the context of the present description, otherwise, all technical and scientific terms used herein have the same meaning as commonly understood by one of ordinary skill in the art to which this invention belongs.

For illustrative purpose, the following embodiments are described in the context of the above architecture as shown in FIG. 1, where E-UTRAN and GERAN/UTRAN are served as examples of a source RAN and a target RAN, respectively. However, one skilled artisan in the art would recognize that the present invention is applicable to other architectures.

With regarding to a handover from the source RAN to the target RAN, e.g., SRVCC without PSHO support (especially SRVCC to GERAN without DTM support), a Routing Area Update (RAU) procedure will be initiated by a UE after a voice call ends. Generally, the duration of the voice call is unpredictable and is very likely to exceed a timer duration, upon the expiration of which, a node for mobility management in the source RAN, e.g., MME, will delete Mobility Management (MM) context and bearers context information for the UE to release resource. Once the deletion occurs, this node is unable to provide the MM context and bearers context in response to a request from a node for management mobility in the target RAN, e.g., SGSN or combined SGSN-MME. Thus, the UE cannot be registered in the node in the target RAN and shall initiate a new attach procedure.

According to one embodiment of the present invention, one node for mobility management in the source RAN is configured to update a correlation between the UE and it in a HLR/HSS after the mobility management is transferred to it or when it receives a request for handover from the source RAN to the target RAN. As a result, the SGSN or combined SGSN-MME in the target RAN can locate a proper node in the source RAN by obtaining from the HLR/HSS the knowledge on which node is the last one for mobility management of the UE in the source RAN, and thus voice call continuity is maintained during a handover from the source RAN to the target RAN.

In one embodiment of the present invention, the correlation may be represented by identity for the UE, e.g., International Mobile Subscriber Identity (IMSI), and identity for the MME, e.g., S3/Gn Address or S10/S16 Address in pair. Therefore, the HLR/HSS can retrieve the identity for the MME based on the identity for the UE.

It shall be noted that according to the embodiments of the present invention, the proper node in the source RAN can be located even if some defects occur. For example, under multiple-operator core network (MOCN) configuration, when P-TMSI/GUTI or even RAI/TAI in a UE is corrupted, a SGSN or combined SGSN-MME in the target RAN can determine the node, to which the UE is lastly attached in the source RAN, by visiting a HLR/HSS.

Figure 3:
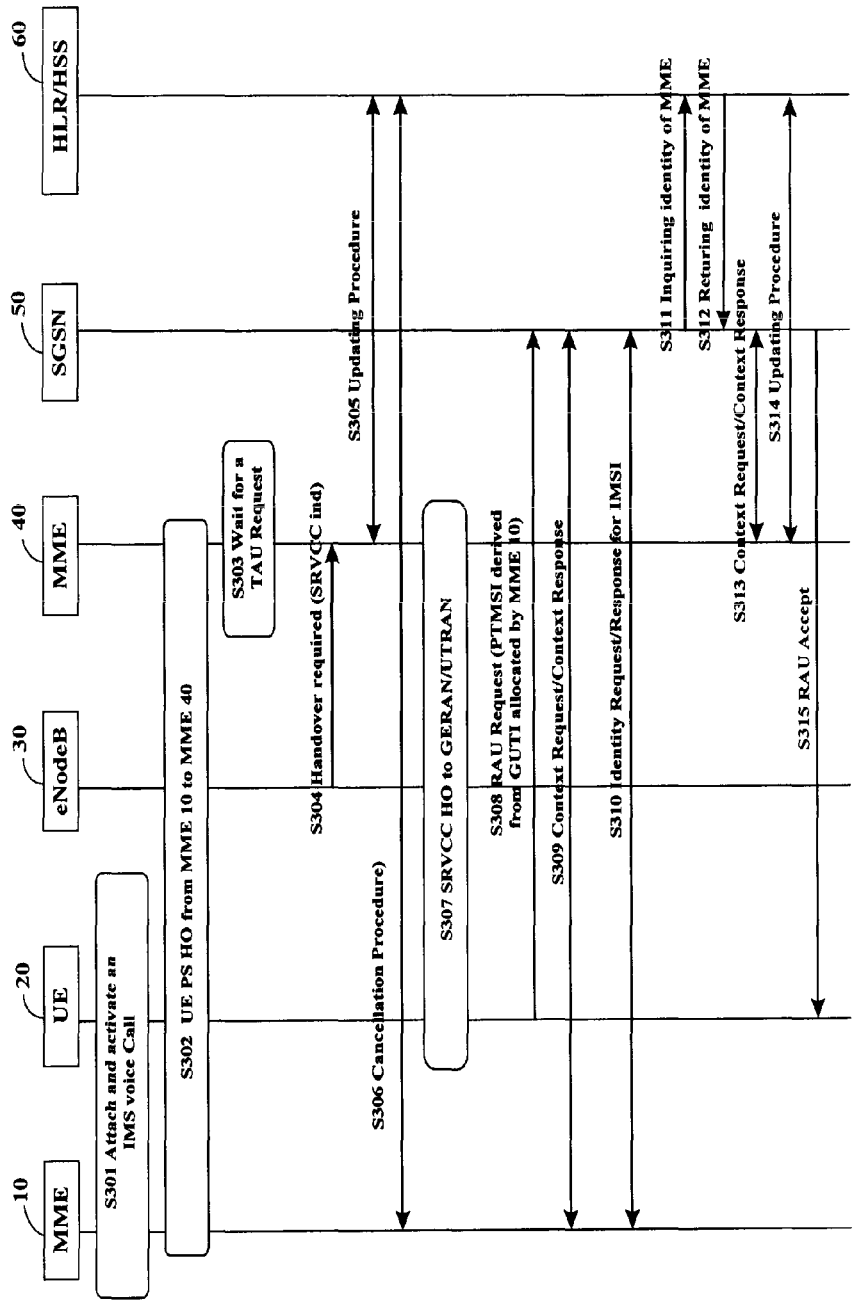
FIG. 3 is a call flow illustrating method steps for enhancing voice call continuity during a handover of a UE according to one exemplary embodiment of the present invention.

FIG. 3 is a call flow illustrating method steps for enhancing voice call continuity during a handover of a UE according to one exemplary embodiment of the present invention.

With reference to FIG. 3, at step S301, in order to activate an IMS voice call, a UE 20 initiates an attach procedure and is attached to a MME 10, which is a serving node for mobility management for the UE in E-UTRAN. To enable SRVCC capability, "SRVCC operation possible" indicator is set to be "true".

If mobility management for the UE 20 shall be transferred from the MME 10 to a MME 40, which is another serving node for mobility management in E-UTRAN, a PS handover procedure is performed between the MME 10 and the MME 40 at step S302. Afterwards, at step S303, the MME 40 starts a timer to wait for a TAU Request from the UE 20. The timer will terminate if it expires or the MME 40 receives the TAU Request.

At step S304, it is also assumed that an eNodeB 30 initiates a handover procedure by sending to the MME 40 a message for requesting a SRVCC handover. Note that at this time, a timer for the TAU request has not expired and thus no TAU procedure is triggered in the MME 40.

Then at step S305, in response to the receipt of the message for requesting the SRVCC handover, the MME 40 initiates an updating procedure for registering a correlation between the UE 20 and the MME 40 in a HLR/HSS 60. As a result, the HLR/HSS 60 will cancel a correlation between the UE 20 and the MME 10.

It should be noted that the updating procedure may also be triggered after a predetermined period elapsing from the transfer of the mobility management for the UE 20 to the MME 40 at step S302. For example, in one embodiment, the MME 40 will initiate the updating procedure upon the expiration of the timer for the TAU Request.

The updating may be performed by using the existing MAP message specified in 3GPP specifications, e.g., "Update Location" message in the case of HLR or diameter message such as "Update Location" or "Notification" message in the case of HSS. An example of the "Update Location request" message is given in Table 1 as below. As shown in Table 1, the message includes information elements "IMSI" for the UE 20 and "S3/Gn Address" or "S10/S16 Address" for the MME 40.

TABLE 1

Update Location Request

| Information element name | Mapping to Diameter AVP | Cat. | Description |
| --- | --- | --- | --- |
| IMSI | User-Name (See IETF RFC 3588 [4]) | M | This information element shall contain the user IMSI, formatted according to 3GPP TS 23.003 [3], clause 2.2. |
| Supported Features (See 3GPP TS 29.229 [9]) | Supported-Features | O | If present, this information element shall contain the list of features supported by the origin host |
| Terminal Information (See 7.3.3) | Terminal-Information | O | This information element shall contain information about the user's mobile equipment. Within this Information Element, only the IMEI and the Software-Version AVPs shall be used on the S6a/S6d interface. |
| ULR Flags (See 7.3.7) | ULR-Flags | M | This Information Element contains a bit mask. See 7.3.7 for the meaning of the bits. |

TABLE 1-continued

Update Location Request

| Information element name | Mapping to Diameter AVP | Cat. | Description |
|---|---|---|---|
| Visited PLMN Id (See 7.3.9) | Visited-PLMN-Id | M | This IE shall contain the MCC and the MNC, see 3GPP TS 23.003 [3]. It may be used to apply roaming based features. |
| RAT Type (See 7.3.13) | RAT-Type | M | This Information Element contains the radio access type the UE is using. See section 7.3.13 for details. |
| SGSN number (See 7.3.102) | SGSN-Number | C | This Information Element contains the ISDN number of the SGSN, see 3GPP TS 23.003 [3]. It shall be present when the message is sent on the S6d interface and the SGSN supports LCS or SMS functionalities or the Gs interface.<br>It may be present when the message is sent on the S6a interface and the requesting node is a combined MME/SGSN. |
| Homogeneous Support of IMS Voice Over PS Sessions | Homogeneous-Support-of-IMS-Voice-Over-PS-Sessions | O | This Information Element, if present, indicates whether or not "IMS Voice over PS Sessions" is supported homogeneously in all TAs or RAs in the serving node (MME or SGSN or combined MME/SGSN).<br>The value "SUPPORTED" indicates that there is support for "IMS Voice over PS Sessions" in all TAs or RAs.<br>The value "NON_SUPPORTED" indicates that theres is not support for "IMS Voice over PS Sessions" in any of the TAs or RAs. |
| V-GMLC address | GMLC-Address | C | This Information Element shall contain if available, the IPv4 or IPv6 address of the V-GMLC associated with the serving node. |
| Active APN | Active-APN | O | This Information Element, if present, contains the list of active APNs stored by the MME or SGSN, including the identity of the PDN GW assigned to each APN. The following information shall be present:<br>Context-Identifier: context id of subscribed APN in use<br>Service-Selection: name of subscribed APN in use<br>MIP6-Agent-Info: including PDN GW identity in use for subscribed APN<br>Visited-Network-identifier: identifies the PLMN where the PDN GW was allocated<br>Specific-APN-Info: list of APN-in use and related PDN GW identity when the subscribed APN is the wildcard APN<br>It may be present when MME or SGSN needs to restore PDN GW data in HSS due to a Reset procedure. |
| UE SRVCC Capability | UE-SRVCC-Capability | C | This information element shall indicate if the UE supports or does not support the SRVCC capability and shall be present if this information is available to the MME or the SGSN. |
| S3/Gn address | S3/Gn-Address | O | This Information Element shall contain, if available, the IPv4 or IPv6 address of the S3/Gn interface associated with the serving node. |
| S10/S16 address | S10/S16-Address | O | This Information Element shall contain, if available, the IPv4 or IPv6 address of the S10/S16 interface associated with the serving node. |

Then the flow proceeds to step S306, the HLR/HSS 60 will initiate an cancellation procedure for deleting context of the UE 20 in MME 10. The procedure can be performed by using Cancel location Request/Response messages. It should be noted that step S306 may be skipped and thus the deletion may be triggered upon expiration of a timer starting after the PS handover is performed from the MME 10 to a MME 40.

At step S307, the SRVCC handover from E-UTRAN to GERAN/UTRAN for the UE 20 is performed. Details on the SRVCC handover can be found in 3GPP TS 23.216, which is incorporated herein by reference in its entirety.

The flow proceeds to step S308, where the UE 20 initiates a RAU procedure to register at a SGSN 50, which is a serving node for mobility management in GERAN/UTRAN. To this end, the UE 20 may send a RAU request to the SGSN 50, including P-TMSI derived from GUTI allocated by the MME 10 and RAI mapped from the TAI when registering at MME 10.

Because the latest available GUTI used by the UE 20 is allocated by the MME 10, the SGSN 50 sends to the MME 10 a Context Request/SGSN Context Request in order to obtain information concerning the UE 20 at step S309. As described above, the information is deleted at step S306 or after an interval elapsing from the PS handover at step S302, and thus the MME 10 returns a Context response with cause value "imsi unknown" to the SGSN 50 at step S309.

At step S310, the SGSN 50 interacts with the UE 20 for obtaining its identity. To this end, the SGSN 50 sends an Identity Request message to the UE 20, which returns an Identity Response message including its IMSI to the SGSN 50.

The flow proceeds to step S311, where the SGSN 50 communicates with a HLR/HSS 60 for obtaining the knowledge on which node is the last one for mobility management of the UE in the source RAN. Then, at step S312, the HLR/HSS 60 retrieves the node based on the identity of UE 20 and returns the result, e.g., the identity of the MME 40 in this embodiment, to the SGSN 50.

Preferably, in the case of HLR, steps S311 and S312 may be performed by means of modified MAP_SEND_ROUTING_INFO_FOR_GPRS Request/Response messages as shown in Table 2. For comparison, standardized MAP_SEND_ROUTING_INFO_FOR_GPRS messages, which is specified in 3GPP TS 29.002, is given in Table 3.

TABLE 2

Modified MAP_SEND_ROUTING_INFO_FOR_GPRS

| Parameter name | Request | Indication | Response | Confirm |
|---|---|---|---|---|
| Invoke id | M | M(=) | M(=) | M(=) |
| IMSI | M | M(=) | | |
| SGSN address | C | C(=) | C | C(=) |
| SGSN number | M | M(=) | | |
| MME address | | | C | C(=) |
| Mobile Not Reachable Reason | | | C | C(=) |
| User error | | | | C(=) |
| Provider error | | | | O |

TABLE 3

Standardized MAP_SEND_ROUTING_INFO_FOR_GPRS by 3GPP

| Parameter name | Request | Indication | Response | Confirm |
|---|---|---|---|---|
| Invoke id | M | M(=) | M(=) | M(=) |
| IMSI | M | M(=) | | |

TABLE 3-continued

Standardized MAP_SEND_ROUTING_INFO_FOR_GPRS by 3GPP

| Parameter name | Request | Indication | Response | Confirm |
|---|---|---|---|---|
| GGSN address | C | C(=) | C | C(=) |
| GGSN number | M | M(=) | | |
| SGSN address | | | C | C(=) |
| Mobile Not Reachable Reason | | | C | C(=) |
| User error | | | C | C(=) |
| Provider error | | | | O |

As compared to the Standardized version, in the modified version, parameters "GGSN address" and "GGSN number" in the Request message sent by the SGSN 50 are replaced with address and number of the SGSN 50, and parameter "SGSN address" in the Response message sent by the HLR is replaced with address of a node for mobility management in the source RAN, e.g., the MME 40 in this embodiment.

In the case of HSS, The messages as shown in Tables 4 and 5 are available for performing steps S311 and S312.

TABLE 4

Send Routing Info Request

| Information element name | Mapping to Diameter AVP | Cat. | Description |
|---|---|---|---|
| IMSI | User-Name (See IETF RFC 3588 [4]) | M | This information element shall contain the user IMSI, formatted according to 3GPP TS 23.003 [3], clause 2.2. |
| SGSN number | SGSN-Number | C | This Information Element contains the ISDN number of the SGSN, |

TABLE 5

Send Routing Info Answer

| Information element name | Mapping to Diameter AVP | Cat. | Description |
|---|---|---|---|
| Result | Result-Code/ Experimental-Result | M | This IE shall contain the result of the operation. The Result-Code AVP shall be used to indicate success/errors as defined in the Diameter Base Protocol. The Experimental-Result AVP shall be used for S13/S13' errors. This is a grouped AVP which shall contain the 3GPP Vendor ID in the Vendor-Id AVP. and the error code in the Experimental-Result-Code AVP. The following errors are applicable in this case: Unknown equipment |
| S3/Gn address | S3/Gn-Address | C | This Information Element shall contain, if available, the IPv4 or IPv6 address of the S3/Gn interface associated with the serving node. It shall be present if the result of the Send Routing Info is DIAMETER_SUCCESS. |

TABLE 5-continued

Send Routing Info Answer

| Information element name | Mapping to Diameter AVP | Cat. | Description |
|---|---|---|---|
| S10/S16 address | S10/S16-Address | C | This Information Element shall contain, if available, the IPv4 or IPv6 address of the S10/S16 interface associated with the serving node. It shall be present if the result of the Send Routing Info is DIAMETER_SUCCESS. |
| RAT Type | RAT-Type | C | This Information Element contains the radio access type the UE is used. It shall be present if the result of the Send Routing Info is DIAMETER_SUCCESS. |

In particular, the SGSN 50 sends a Send Routing Info Request message including the IMSI of the UE 20, the SGSN number and address of the SGSN 50. As a response, the HSS returns a Send Routing Info Answer message including S3/Gn address or S10/S16 address for the MME 40 and RAT type.

At step S313, the SGSN 50 sends to the MME 40 a Context Request/SGSN Context Request in order to obtain information concerning the UE 20, and as a response, the MME 40 returns a Context response with the information concerning the UE 20.

At step S314, the SGSN 50 initiates an updating procedure for registering a correlation between the UE and the SGSN 50 in the HLR/HSS 60 in response to the receipt of the Context Response message from the MME 40. Likewise, the updating may be performed by using the existing MAP message specified in 3GPP specifications, e.g., "Update Location" message in the case of HLR or diameter message such as "Update Location" or "Notification" message in the case of HSS.

At step S315, the SGSN 50 sends to the UE 20 a RAU Accept message including new P-TMSI and new P-TMSI Signature allocated to the UE 20.

Figure 4:
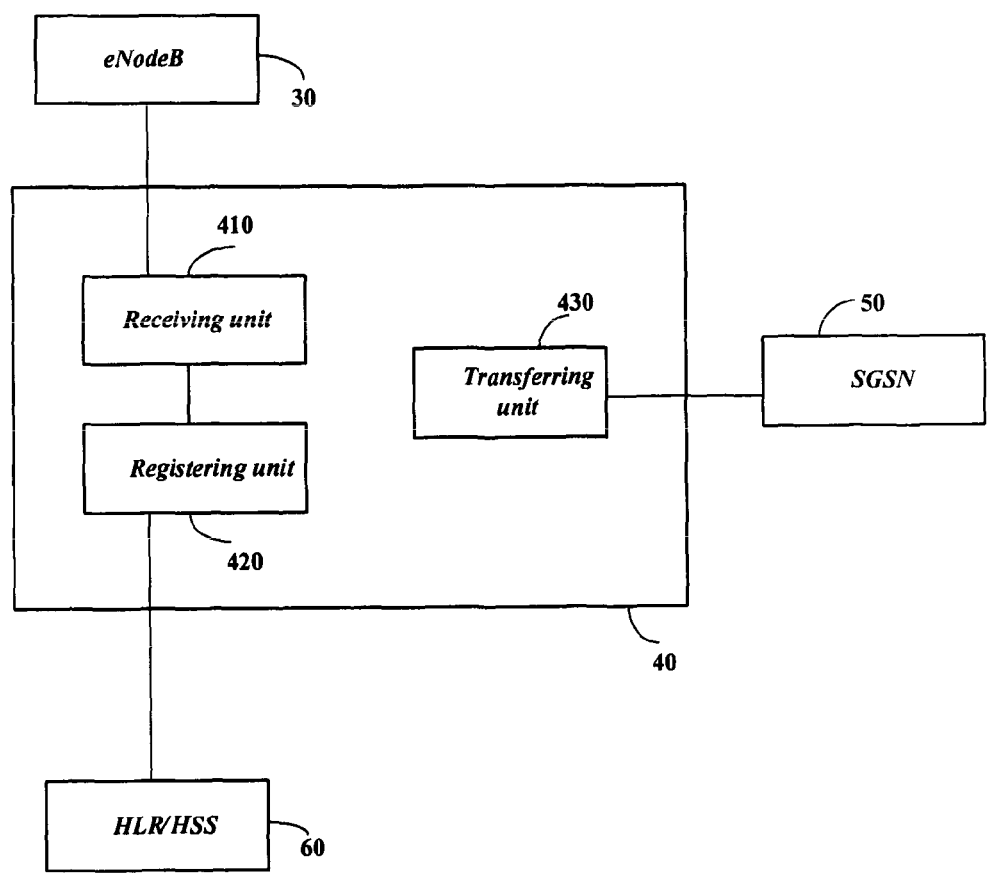
FIG. 4 is a block diagram illustrating a Mobility Management Entity according to one embodiment of the present invention.

FIG. 4 is a block diagram illustrating a Mobility Management Entity (MME) according to one embodiment of the present invention.

Figure 2:
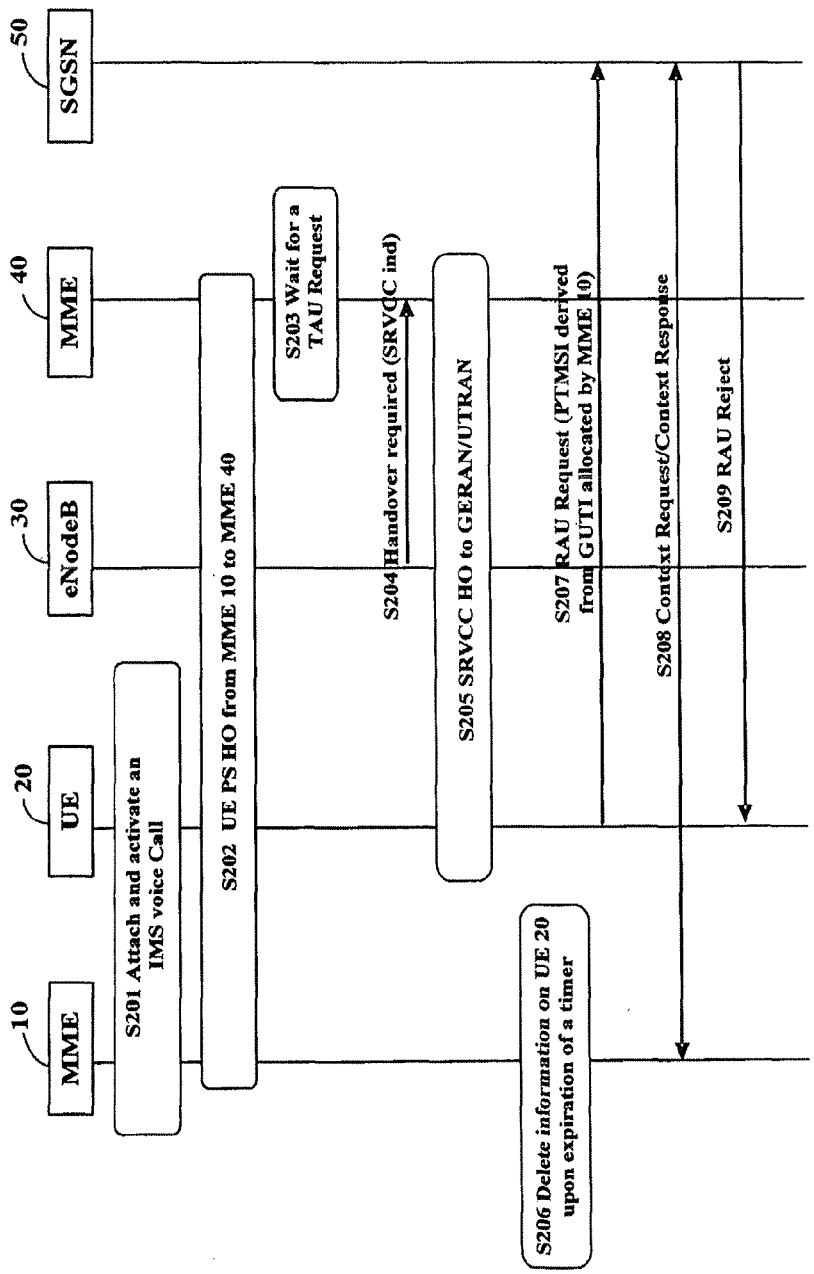
FIG. 2 illustrates an example of an interruption which occurs during a SRVCC handover from E-UTRAN to GERAN/UTRAN.

With reference to FIG. 4, a MME 40 comprises a receiving unit 410, a registering unit 420 and a transferring unit 430. The receiving unit 410 is configured to receive, e.g., from the eNodeB 30 as shown in FIGS. 2 and 3, a request for a handover of a UE from E-UTRAN to UTRAN/GERAN and to forward the request to the registering unit 420. The registering unit 420 is configured to in response to the request, register a correlation between the UE 20 and MME 40 in a HLR/HSS 60, or register the correlation after a predetermined period elapsing from a handover of the UE to the MME 40. The transferring unit 430 is configured to in response to a request for transferring from a node for mobility management in UTRAN/GERAN, e.g., the SGSN 50 as shown in FIGS. 2 and 3, transfer the mobility management for the UE to the SGSN 50.

Figure 5:
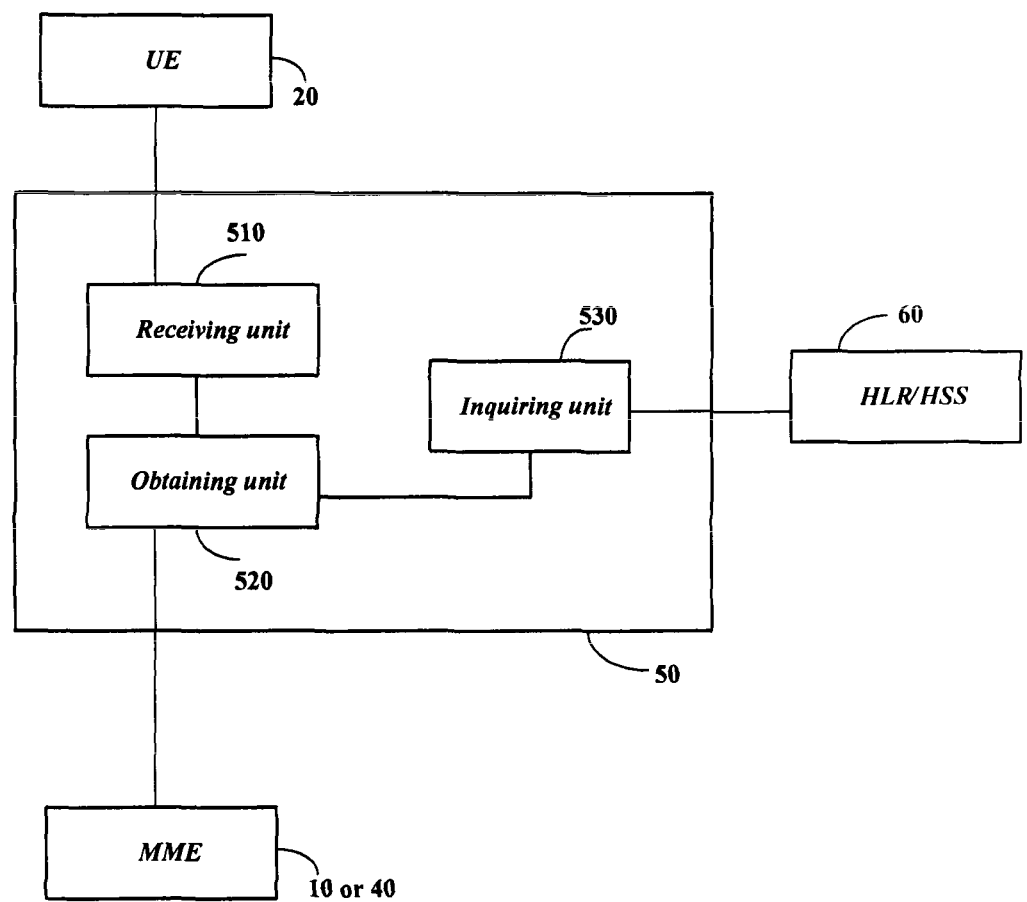
FIG. 5 is a block diagram illustrating a Serving GPRS Support Node according to one embodiment of the present invention.

FIG. 5 is a block diagram illustrating a Serving GPRS Support Node according to one embodiment of the present invention.

With reference to FIG. 5, a SGSN 50 comprises a receiving unit 510, an obtaining unit 520 and an inquiring unit 530.

The receiving unit 510 is configured to receive a request for registering in the SGSN 50 from a UE 20 and forward the request to the obtaining unit 520.

The obtaining unit 520 is configured to interact with a node for mobility management in E-UTRAN, e.g., the MME 10 or 40 as shown in FIGS. 2 and 3, to obtain the mobility management for the UE 20 and report the failure of the obtaining if occurs to the inquiring unit 530. This unit is also configured to determine which node it shall interact with based on the request from the UE 20, or based on knowledge from a HLR/HSS 60 when it fails to obtain the mobility management from the node indicated by the request.

The inquiring unit 530 is configured to inquire of the HLR/HSS 60 about the knowledge on which node is the last one for mobility management of the UE 20 in E-UTRAN and forward the knowledge to the obtaining unit 520.

It should be noted that the aforesaid embodiments are illustrative of this invention instead of restricting this invention, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A Mobility Management Entity (MME), comprising:
   one or more hardware elements;
   wherein said one or more hardware elements are configured to:
   receive a request for a handover of a User Equipment (UE) from a source radio access network, RAN, to a target RAN, wherein the source RAN provides voice service via a packet switched domain and the target RAN provides voice service via a circuit switched domain;
   register, in response to the request for the handover, or after a predetermined period elapsing from a handover of the UE to the MME, a correlation between the UE and the MME in a Home Location Register/Home Subscriber Server (HLR/HSS); and
   transfer, in response to a request for transferring from a Serving GPRS Support Node (SGSN), the mobility management for the UE to the SGSN.

2. The MME according to claim 1, wherein the source RAN is a E-UTRAN and the target RAN is a UTRAN/GERAN.

3. The MME according to claim 1, wherein the said one or more hardware elements are configured to registers the correlation by sending an Update Location Request to the HLR/HSS.

4. A Serving GPRS Support Node (SGSN), comprising:
   one or more hardware elements;
   wherein said one or more hardware elements are configured to:
   receive a request for registering in the SGSN from a user equipment UE upon a handover from a source radio access network, RAN, to a target RAN, the source RAN providing voice service via a packet switched domain and the target RAN providing voice service via a circuit switched domain;
obtain mobility management for the UE from the target RAN;
inquire of a Home Location Register/Home Subscriber Server (HLR/HSS), about a first Mobility Management Entity (MME) for mobility management for the UE in the source RAN if the mobility management for the UE fails to be transferred from a second MME to the SGSN, wherein the first MME is determined based on a correlation between the UE and the first MME registered in the HLR/HSS, and the second MME is determined from the request for registering from the UE.

5. The SGSN according to claim 4, wherein the source RAN is a E-UTRAN and the target RAN is a UTRAN/GERAN.

6. The SGSN according to claim 4, wherein the inquiring is performed by a MAP_SEND_ROUTING_INFO_FOR_GPRS Request/MAP_SEND_ROUTING_INFO_FOR_GPRS Response, and wherein, in the MAP_SEND_ROUTING_INFO_FOR_GPRS Request, parameters "GGSN address" and "GGSN number" are replaced with an address and a number of the SGSN.

7. The SGSN according to claim 4, wherein the inquiring is performed by a request message and a response message, the request message including information elements "IMSI" for the UE and "SGSN number" for the SGSN, and the response message including information element "S3/Gn Address" or "S10/S16 Address" for the first MME.

8. A method for enhancing voice call continuity during a handover of a user equipment UE from a source radio access network RAN, to a target RAN, the source RAN providing voice service via a packet switched domain and the target RAN providing voice service via a circuit switched domain, the method comprising:
in response to a request for the handover from the source RAN to the target RAN, or after a predetermined period elapsing from a handover of the UE to a first node for mobility management in the source RAN, registering a correlation between the UE and the first node in a Home Location Register/Home Subscriber Server HLR/HSS; and
in response to a request for transferring from a second node for mobility management in the target RAN, transferring the mobility management for the UE from the first node to the second node.

9. The method according to claim 8, wherein the request for transferring is made by the following steps:
receiving a request for registering in the second node from the UE;
if the received request fails to result in transfer of the mobility management for the UE from a third node for mobility management in the source RAN to the second node, the second node inquiring of the HLR/HSS about the first node based on the correlation, wherein the third node is determined from the request for registering; and
the second node sending to the first node the request for transferring.

10. The method according to claim 9, wherein the source RAN is a E-UTRAN and the target RAN is a UTRAN/GERAN, and the first node and the third node are Mobility Management Entities (MMEs), and the second node is Serving GPRS Support Node SGSN.

11. The method according to claim 8, wherein the registering step is performed by sending an Update Location Request from the first node to the HLR/HSS.

12. The method according to claim 8, wherein the inquiring is performed by a MAP_SEND_ROUTING_INFO_FOR_GPRS Request/MAP_SEND_ROUTING_INFO_FOR_GPRS Response, and wherein, in the MAP_SEND_ROUTING_INFO_FOR_GPRS Request, parameters "GGSN address" and "GGSN number" are replaced with an address and a number of the second node.

13. The method according to claim 8, wherein the inquiring is performed by a request message and a response message, the request message including information elements "IMSI" for the UE and "SGSN number" for the second node, and the response message including information element "S3/Gn Address" or "S10/S16 Address" for the first node.

14. A method for enhancing voice call continuity during a handover of a user equipment UE from a source radio access network, RAN, to a target RAN, the source RAN providing voice service via a packet switched domain and the target RAN providing voice service via a circuit switched domain, the method comprising:
receiving a request for registering in a first node for mobility management in the target RAN from the UE;
if the mobility management for the UE fails to be transferred from a second node for mobility management in the source RAN to the first node, inquiring of a Home Location Register/Home Subscriber Server (HLR/HSS) about a third node for mobility management for the UE in the source RAN, wherein the second node is determined from the request for registering, and the third node is determined based on a correlation between the UE and the third node; and
sending to the third node a request for transferring the mobility management for the UE from the third node to the first node.

15. The method according to claim 14, wherein the correlation is registered in the HLR/HSS by the following step:
in response to a request for the handover from the source RAN to the target RAN, or after a predetermined period elapsing from a handover of the UE to the third node for mobility management in the source RAN, the third node registering the correlation in the HLR/HSS.

16. The method according to claim 14, wherein the target RAN is a UTRAN/GERAN and the source RAN is a E-UTRAN, and the first node is Serving a GPRS Support Node (SGSN), and the second node and the third node are Mobility Management Entities (MME).

17. The method according to claim 14, wherein the registering of the correlation is performed by sending an Update Location Request from the third node to the HLR/HSS.

18. The method according to claim 14, wherein the inquiring is performed by a MAP_SEND_ROUTING_INFO_FOR_GPRS Request/MAP_SEND_ROUTING_INFO_FOR_GPRS Response, and wherein, in the MAP_SEND_ROUTING_INFO_FOR_GPRS Request, parameters "GGSN address" and "GGSN number" are replaced with an address and a number of the first node.

19. The method according to claim 14, wherein the inquiring is performed by a request message and a response message, the request message including information elements "IMSI" for the UE and "SGSN number" for the first node, and the response message including information element "S3/Gn Address" or "S10/S16 Address" for the third node.

* * * * *